(12) United States Patent
Allen

(10) Patent No.: US 12,098,772 B2
(45) Date of Patent: Sep. 24, 2024

(54) VALVE CARTRIDGE HOUSING ASSEMBLY

(71) Applicant: Delta Faucet Company, Indianapolis, IN (US)

(72) Inventor: Benjamin Michael Allen, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 549 days.

(21) Appl. No.: 17/389,788

(22) Filed: Jul. 30, 2021

(65) Prior Publication Data

US 2021/0356048 A1 Nov. 18, 2021

Related U.S. Application Data

(62) Division of application No. 16/451,846, filed on Jun. 25, 2019, now Pat. No. 11,092,250.

(51) Int. Cl.
| F16K 11/078 | (2006.01) |
| E03C 1/04 | (2006.01) |
| F16K 11/00 | (2006.01) |
| F16K 11/074 | (2006.01) |
| F16K 27/04 | (2006.01) |
| F16K 31/60 | (2006.01) |

(52) U.S. Cl.
CPC ........ F16K 11/0782 (2013.01); E03C 1/0412 (2013.01); F16K 11/074 (2013.01); F16K 11/0787 (2013.01); F16K 19/006 (2013.01); F16K 27/045 (2013.01); F16K 31/60 (2013.01); F16K 31/605 (2013.01); *Y10T 137/87579* (2015.04); *Y10T 137/9464* (2015.04)

(58) Field of Classification Search
CPC ............. F16K 11/0782; F16K 11/0787; F16K 31/605; F16K 11/074; F16K 27/045; F16K 31/60; F16K 19/006; Y10T 137/87579; Y10T 137/9464; E03C 1/0412; E03C 1/04
USPC .................................... 137/801, 603; 4/677
See application file for complete search history.

(56) References Cited

U.S. PATENT DOCUMENTS

| 4,651,770 | A | 3/1987 | Denham et al. |
| 5,316,039 | A | 5/1994 | Haag et al. |
| 5,388,805 | A | 2/1995 | Bathrick et al. |
| 6,123,106 | A | 9/2000 | Benstead |
| 6,371,163 | B1 | 4/2002 | Kahle |
| 7,011,106 | B2 | 3/2006 | Kawolics |
| 7,331,359 | B2 | 2/2008 | Shay |
| 7,753,074 | B2 | 7/2010 | Rosko et al. |

(Continued)

FOREIGN PATENT DOCUMENTS

| CN | 101067307 A | 11/2007 |
| CN | 103291954 A | 9/2013 |

(Continued)

*Primary Examiner* — John Bastianelli
(74) *Attorney, Agent, or Firm* — Bose McKinney & Evans LLP

(57) ABSTRACT

A faucet assembly including a housing body, a valve assembly received within the housing body, and a waterway assembly having a base supporting the valve assembly. A face seal is positioned between the valve assembly and the base of the waterway assembly. An upper radial seal is positioned between the valve assembly and an internal surface of the housing body, and a lower radial seal is positioned between the base and the internal surface of the housing body.

20 Claims, 13 Drawing Sheets

(56) References Cited

U.S. PATENT DOCUMENTS

| | | |
|---|---|---|
| 7,766,043 B2 | 8/2010 | Thomas et al. |
| 7,819,137 B2 | 10/2010 | Nelson et al. |
| 7,896,025 B2 | 3/2011 | Hanson |
| 8,365,770 B2 | 2/2013 | Thomas et al. |
| 8,800,962 B2 | 8/2014 | Ritter et al. |
| 8,985,146 B2 | 3/2015 | Thomas et al. |
| 8,991,425 B2 | 3/2015 | DeVries et al. |
| 9,951,880 B2 | 4/2018 | Thomas et al. |
| 11,092,250 B2 | 8/2021 | Allen |
| 2004/0094202 A1 | 5/2004 | Kawolics |
| 2005/0022885 A1 | 2/2005 | Marty |
| 2007/0131288 A1 | 6/2007 | Moldthan |
| 2007/0271695 A1 | 11/2007 | Thomas et al. |
| 2007/0277889 A1* | 12/2007 | Rosko ............... F16K 11/0782 137/625.4 |
| 2008/0023085 A1 | 1/2008 | Rosko et al. |
| 2009/0001310 A1 | 1/2009 | Hanson |
| 2009/0020177 A1 | 1/2009 | Nelson et al. |
| 2010/0155505 A1 | 6/2010 | Lopp |
| 2010/0313979 A1 | 12/2010 | Thomas et al. |
| 2011/0100478 A1 | 5/2011 | Allen |
| 2013/0146164 A1 | 6/2013 | Thomas et al. |
| 2013/0263936 A1 | 10/2013 | DeVries et al. |
| 2015/0192214 A1 | 7/2015 | Thomas et al. |
| 2015/0211646 A1* | 7/2015 | Kemp ............... F16K 31/605 137/625.17 |
| 2016/0305101 A1 | 10/2016 | Liu |
| 2017/0009901 A1 | 1/2017 | Ritter et al. |

FOREIGN PATENT DOCUMENTS

| | | |
|---|---|---|
| CN | 103322234 A | 9/2013 |
| CN | 103912693 A | 7/2014 |
| CN | 106286931 A | 1/2017 |
| CN | 109630719 A | 4/2019 |
| WO | WO 2005/085688 | 9/2005 |
| WO | WO 2007/139605 | 6/2007 |

\* cited by examiner

VALVE CARTRIDGE HOUSING ASSEMBLY

CROSS-REFERENCE TO RELATED APPLICATIONS

The present application is a divisional of U.S. patent application Ser. No. 16/451,846, filed Jun. 25, 2019, the disclosure of which is expressly incorporated herein by reference.

BACKGROUND AND SUMMARY OF THE INVENTION

The present invention generally relates to a valve assembly, and more particularly, to an improved valve cartridge housing assembly with additional protection against leaks.

Single handle faucets typically include mixing valves that control the flow of both hot and cold water to a delivery spout. These faucets have found wide acceptance and are commonly constructed such that a handle is movable in distinct directions to adjust the temperature (i.e., the mix of hot and cold water) and the flow rate of water. Such conventional mixing valves typically include a machined brass body and associated brass fittings. The brass body usually includes a hot water inlet, a cold water inlet, and a mixed water outlet. An adjustable valve element, typically either a mixing ball or a slidable plate, is manipulated by a handle to control the aforementioned temperature and flow rate of water.

Additionally, faucets are known to use valve cartridge assemblies to control the flow rate and/or the temperature of water in both single-handle and double-handle faucets. Known valve cartridge assemblies may rely on compression of the cartridge to a bottom face seal to create a fluid-tight engagement in an attempt to prevent leaks. The compression of the cartridge to the bottom face seal is often the result of the tightening of a bonnet nut onto the valve cartridge. However, it is not always easy to apply enough torque to the bonnet nut to reliably create a fluid-tight seal. A loose bonnet nut may result in below-deck leaks that are difficult to detect and cause damage that is expensive and difficult to repair. An improved design that better prevents these leaks is desired.

According to an illustrative embodiment of the present disclosure, a faucet assembly includes a housing body having a sidewall defining an opening, and a faucet valve assembly received within the opening of the housing body. An upper annular seal is supported by the faucet valve assembly and is configured to sealingly engage with an internal surface of the housing body. A base supports the faucet valve assembly at a valve interface, and a face seal is positioned at the valve interface between the faucet valve assembly and the base. A lower annular seal is supported by the base and is configured to sealingly engage with the internal surface of the housing body. A plurality of tubular members having first and second ends are supported by the base, and are configured to be in fluid communication with the faucet valve assembly. A mounting nut is configured to removably couple to the housing body within the opening defined by the sidewall.

According to another illustrative embodiment of the present disclosure, a faucet assembly includes a housing body including a sidewall defining an opening, and a valve assembly received within the opening of the housing body. The valve assembly includes a lower housing with a bottom face having a plurality of openings. The lower housing of the valve assembly further includes a groove around a perimeter of the lower housing. A first o-ring is received within the groove of the lower housing of the valve assembly, and is configured to sealingly engage with an internal surface of the housing body. A base is disposed within the housing body and includes a first face, a second face, and a plurality of openings extending between the first face and the second face, wherein the openings are configured to align with the plurality of the openings of the cartridge valve assembly. A plurality of tubular members having first and second ends are provided, the first ends received by the openings of the base. A mounting nut is configured to removably couple to the housing body within the opening defined by the sidewall. A face seal is positioned intermediate the faucet valve assembly and the base, wherein the mounting nut when tightened is configured to compress the face seal between the faucet valve assembly and the base to form a substantially fluid-tight seal.

According to yet another illustrative embodiment of the present disclosure, faucet assembly includes a housing body including a sidewall defining an opening, and a valve assembly received within the opening of the housing body. A waterway assembly including a base supports the valve assembly. A face seal is positioned between the valve assembly and the base of the waterway assembly. An upper radial seal is positioned between the valve assembly and an internal surface of the housing body, and above the face seal. A lower radial seal is positioned between the base and the internal surface of the housing body, and below the face seal.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Figure 1A:
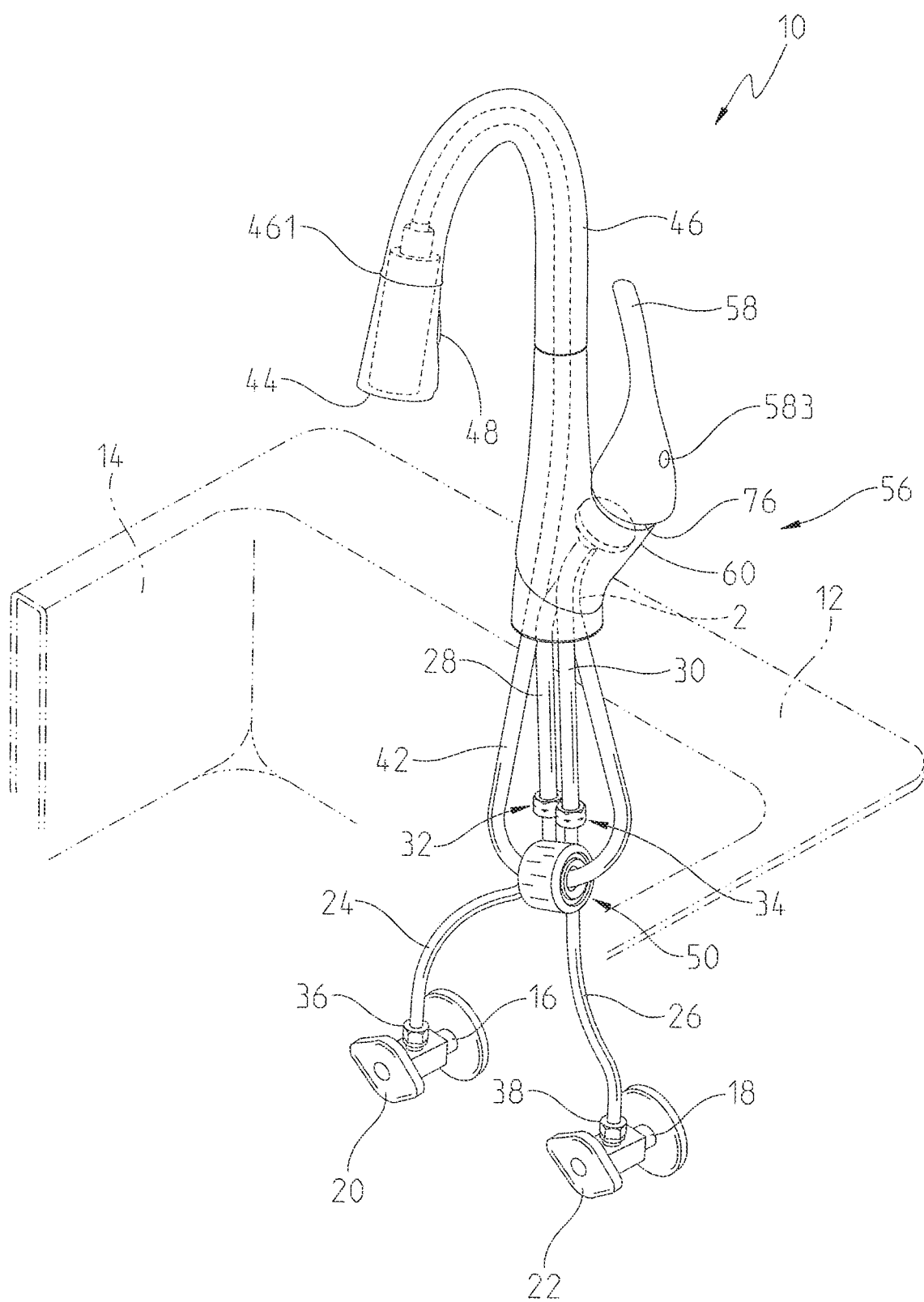
FIG. 1A is a perspective view of an illustrative embodiment faucet of the present disclosure including a molded waterway assembly mounted to a sink deck and fluidly coupled to hot and cold water supply lines.
Figure 1B:
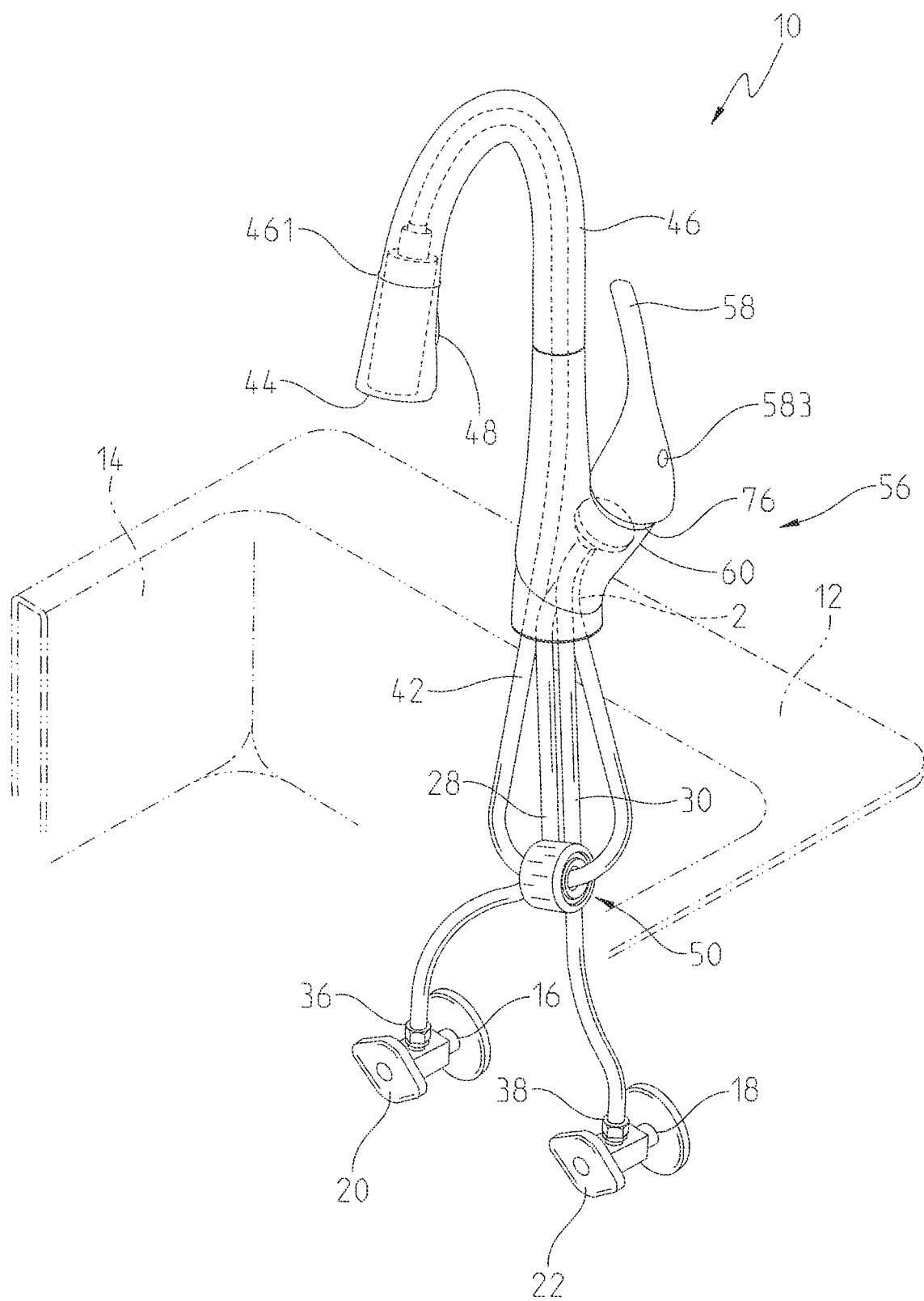
FIG. 1B is a perspective view similar to FIG. 1A, showing another illustrative fluid coupling to hot and cold water supply lines.
Figure 1C:
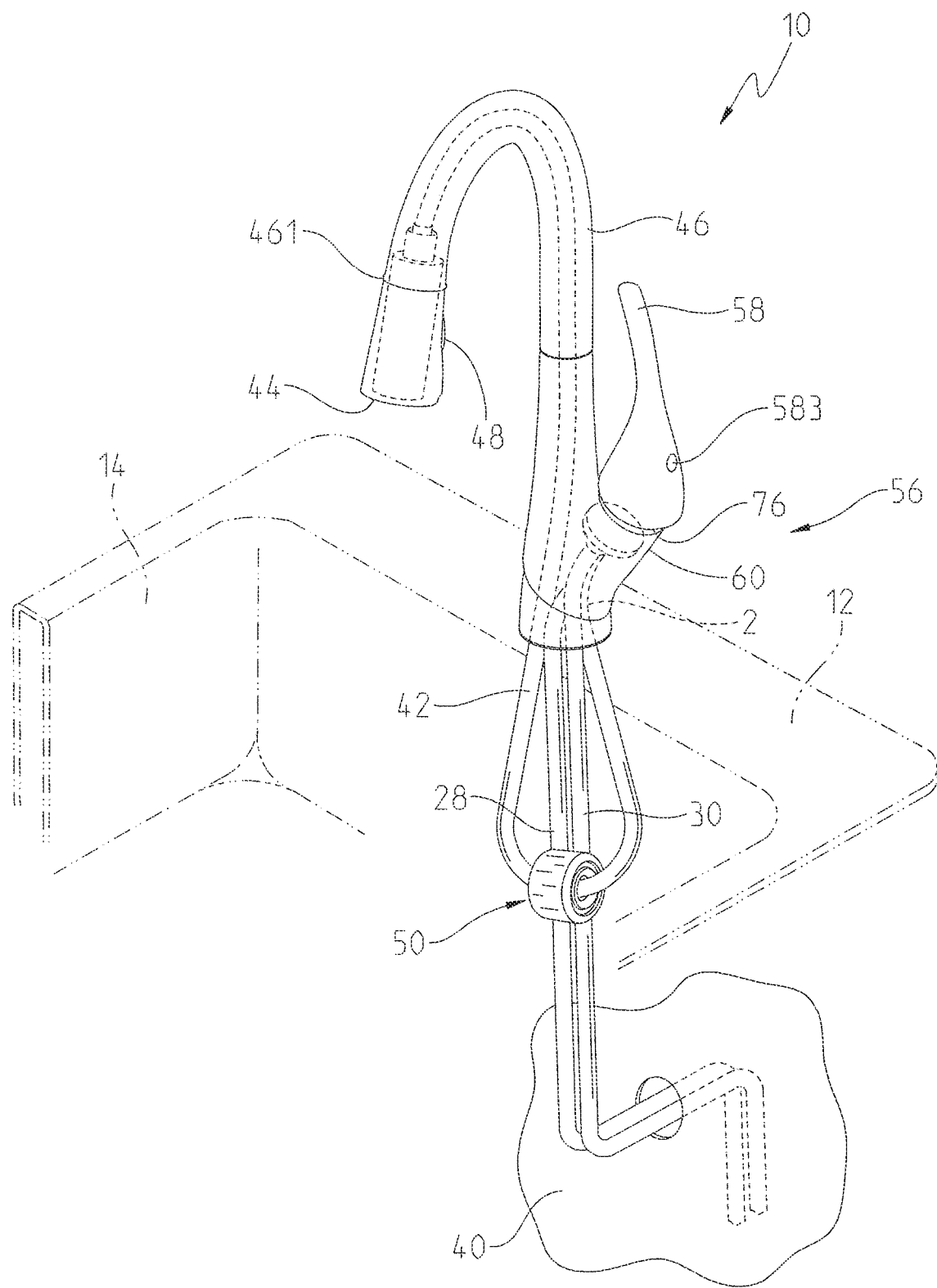
FIG. 1C is a perspective view similar to FIG. 1A, showing a further illustrative coupling to hot and cold water supply lines.
Figure 2:
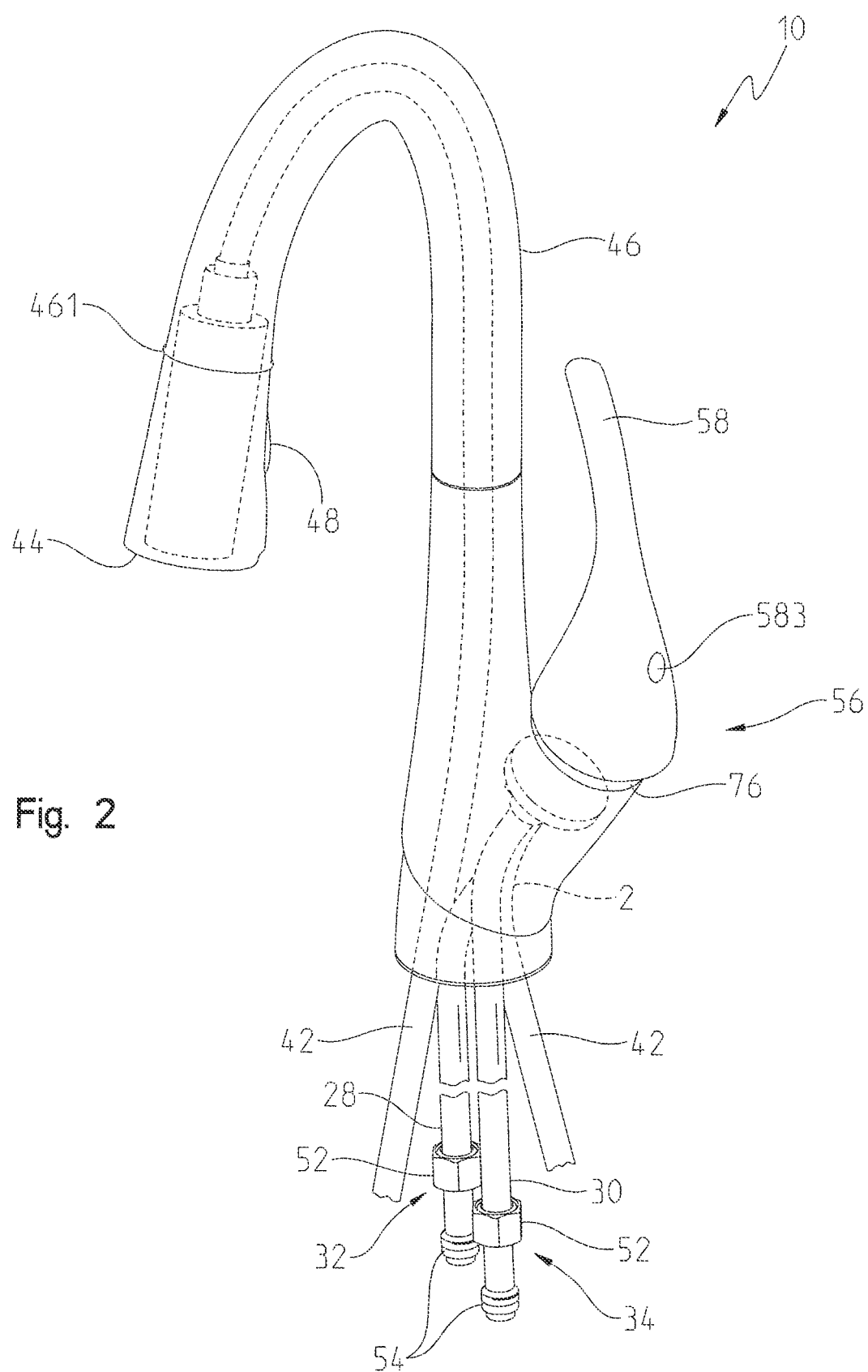
FIG. 2 is a perspective view showing an illustrative overmolded coupling assembly for coupling the faucet of FIG. 1A to hot and cold water supply lines.

Referring initially to FIG. 1A, an illustrative embodiment faucet 10 is shown mounted to a sink or mounting deck 12 above a sink basin 14. The faucet 10 is fluidly coupled to hot and cold water supplies or sources 16 and 18 through conventional stops 20 and 22, respectively. Hot and cold water risers 24 and 26, respectively, may fluidly couple the stops 20 and 22 to hot and cold water inlet fluid transport components, or tubes 28 and 30, respectively. While FIG. 1 illustrates hot and cold water risers 24 and 26 coupled to inlet tubes 28 and 30 through fluid couplings 32 and 34, it should be appreciated that inlet tubes 28 and 30 may extend uninterrupted from the faucet 10 to the stops 20 and 22 through fluid couplings 36 and 38, as shown in FIG. 1B. Additionally, FIG. 1C shows an illustrative embodiment where inlet tubes 28 and 30 are coupled behind the wall 40 to the plumbing system of the building or house. Referring briefly to FIG. 2, the fluid couplings 32 and 34 may each illustratively include an overmolded coupler 52 and a cooperating internally threaded nut 54.

Referring again to FIGS. 1A-1C, illustrative faucet 10 further receives an outlet tube 42 to carry tempered water through the illustrative faucet 10 to an outlet 44 of the faucet 10. In the illustrative embodiment shown, the illustrative faucet 10 comprises a pull-down kitchen faucet, in which the outlet (e.g., sprayhead) 44 may be configured to move from the body (e.g., delivery spout) 46 of the faucet 10 to another position a user desires. Additionally, the outlet 44 may include a push button or other type of trigger 48 which allows the flow of water to be toggled between a stream-like flow and a spray-like flow. In such an embodiment, the outlet tube 44 may comprise a hose, which can be extended from the distal end 461 of the faucet body 46 for ease in positioning the outlet 44 as desired. The outlet tube 42 may include a weight 50 to facilitate the replacement of the outlet 44 to a docking position at the distal end 461 of the faucet body 46, as illustrated by FIGS. 1A-1C. In other embodiments, the faucet 10 may comprise a single handle bathroom faucet, a single handle non-pull-down kitchen faucet, or a variety of other faucets. In one illustrative embodiment, the tubes 28, 30, and 42 may include certain additional features, such as corrugated walls for improved flexibility.

Figure 3A:
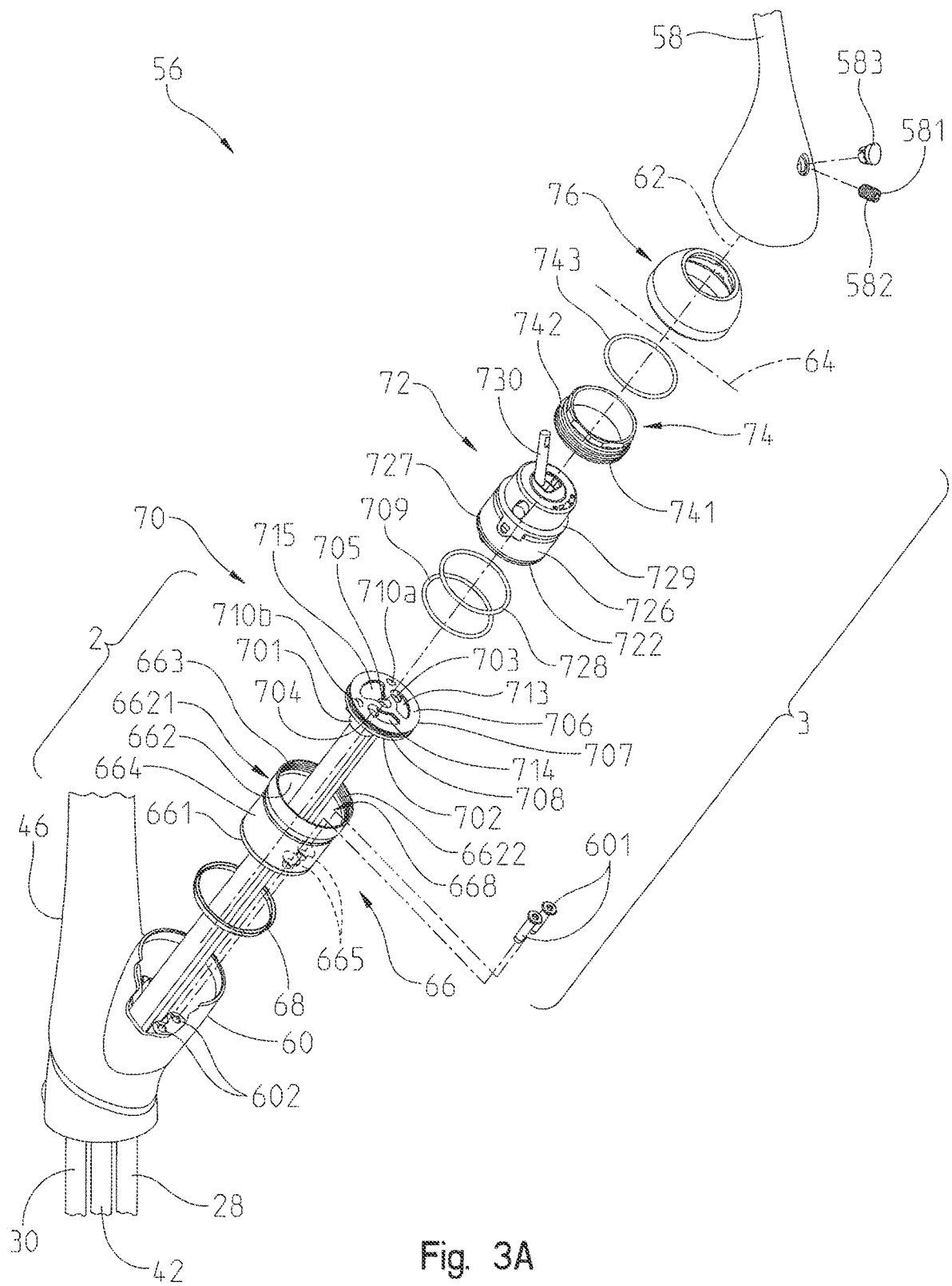
FIG. 3A is a partial exploded top perspective view of a valve housing assembly of the illustrative embodiment faucet of FIG. 1A.
Figure 3B:
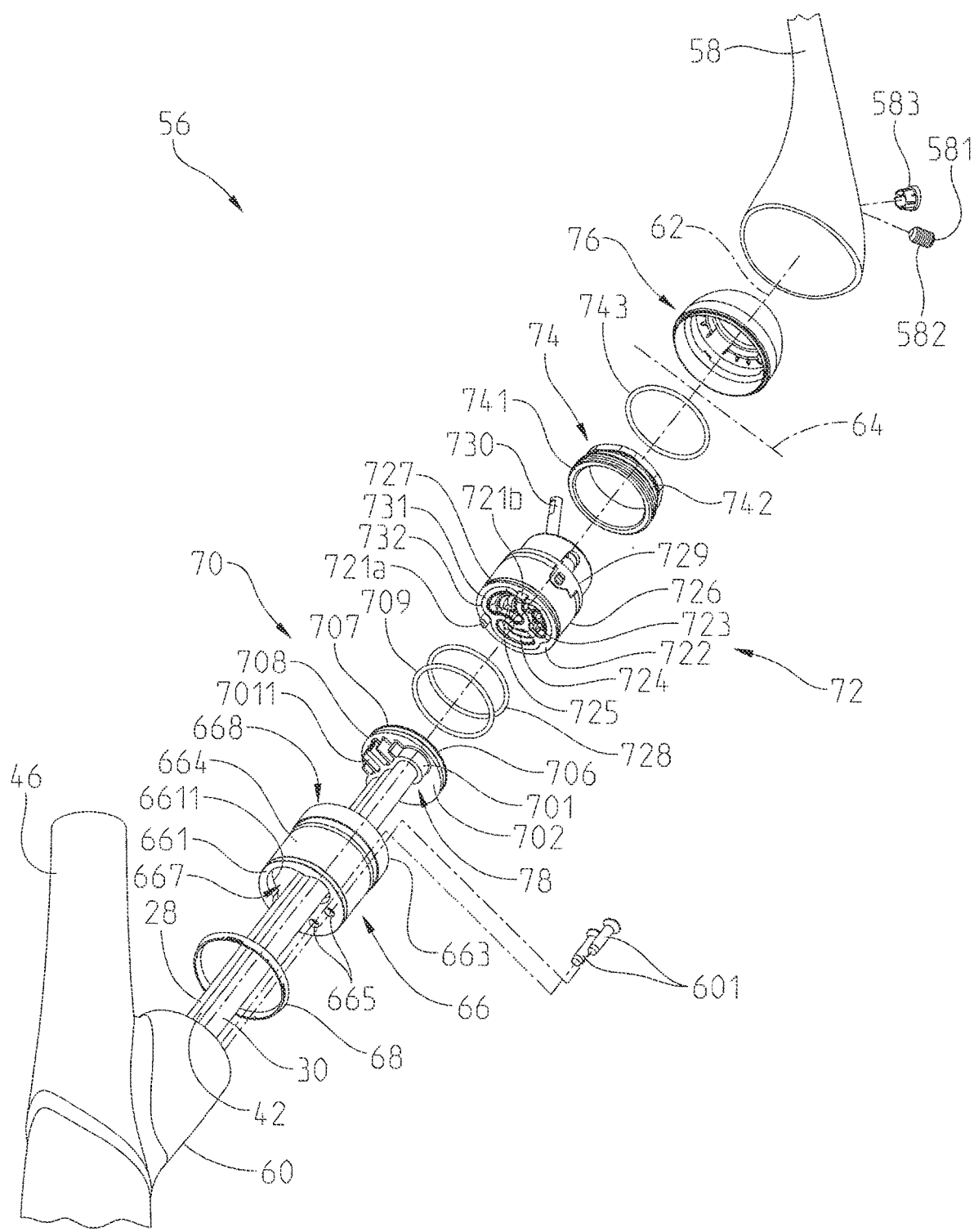
FIG. 3B is a partial exploded bottom perspective view of the valve housing assembly of FIG. 3A.

Referring to FIGS. 1-4, the illustrative faucet 10 includes a valve housing assembly 56, comprising a handle 58 coupled to the faucet body 46 via a branch or hub 60, and a valve assembly 3 (FIG. 3). As described further herein, in an illustrative embodiment, the handle 58 of the illustrative faucet 10 may be rotated about an axis substantially parallel to a longitudinal axis 62 (FIG. 3) of valve housing assembly 56 or about the longitudinal axis 62 (FIG. 3) of the valve housing assembly 56. In a further illustrative embodiment, the handle 58 of the faucet 10 may be lifted in a direction substantially away from the faucet body 46, resulting in a pivoting movement about an axis 64 (FIG. 3) orthogonal or perpendicular to the longitudinal axis 62 (FIG. 3). In yet another illustrative embodiment, the handle 58 of the faucet 10 may be capable of both rotating about an axis substantially parallel to the longitudinal axis 62 (FIG. 3) of the valve housing assembly 56 and being lifted in a direction substantially away from the faucet body 46 for a pivoting movement about axis 64 (FIG. 3). For example, in the illustrative embodiment of a faucet 10 as shown, having a single cartridge valve-style handle, the handle 58 may be lifted to pivot about axis 64 (FIG. 3) to control the water flow velocity or rate of the faucet 10, wherein various angles of the handle 58 correspond with various rates of water flow. Additionally, the handle 58 may be rotated about axis 62 (FIG. 3) to control the temperature of the water flow. In other embodiments, the handle 58 may be rotated about axis 62 (FIG. 3) to control the water flow rate either instead of or in addition to the temperature of the water flow.

Figure 4:
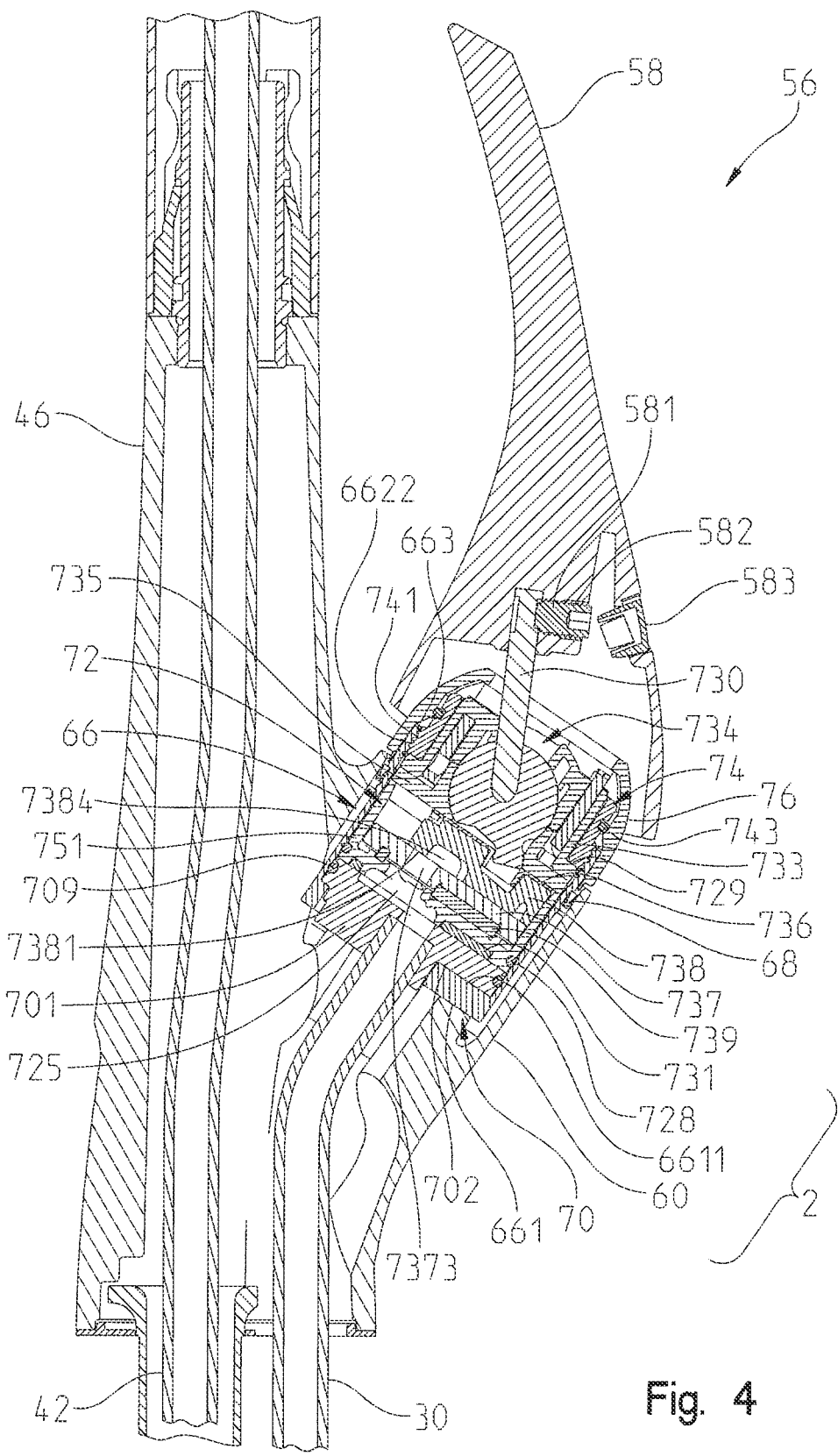
FIG. 4 is a cross-section view of the valve housing assembly of FIG. 3A.
Figure 5:
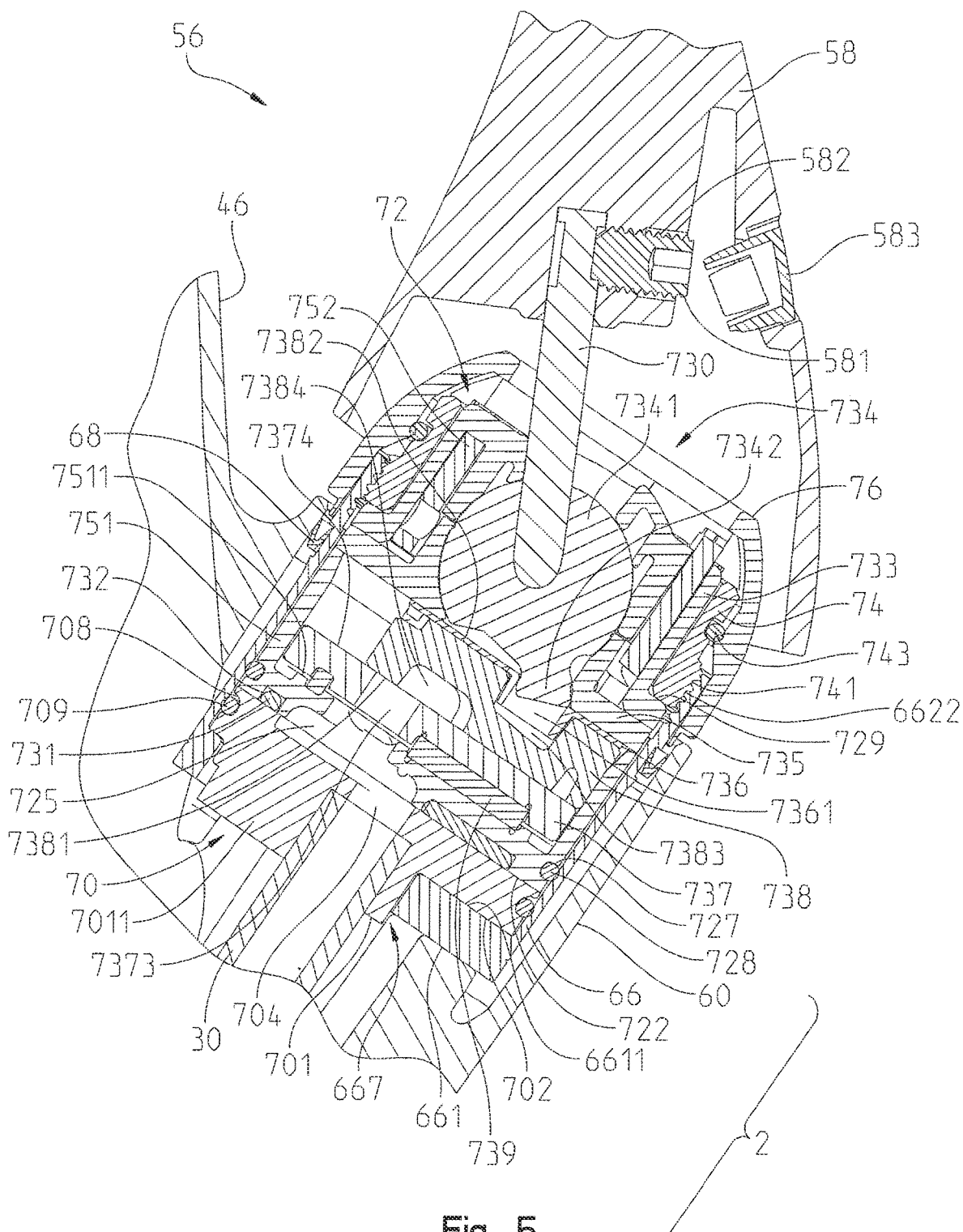
FIG. 5 is a cross-section view of a waterway assembly and a cartridge valve assembly of FIG. 4.

Referring specifically now to FIGS. 3-5, the inner components of the valve housing assembly 56, including the components of valve assembly 3, are shown. Illustratively, a valve housing body, or bonnet cup 66 is disposed within the hub 60 of the valve housing assembly 56 via a seal 68, illustratively a labyrinth seal, although other forms of seals may be imagined, and fixed to the hub 60 via screw holes 665 located on a bottom face 661 of the bonnet cup 66, screws 601, and screw holes 602 within the hub 60. In another embodiment, the bonnet cup 66 may be coupled to the hub 60 in other ways, including other fasteners or solely a friction fit formed between the bonnet cup 66 and the seal 68. In embodiments using the seal 68, the seal 68 comprises rubber or another elastic polymer, which facilitates a fluid-tight seal between the seal 68 and the bonnet cup 66. The bonnet cup 66 may also be affixed to the hub 60 through the process of overmolding or other manufacturing techniques. The bonnet cup 66 includes a sidewall 664 with an inner surface 662. Illustratively, the bonnet cup is cylindrical in shape, with an opening 668 opposite the bottom face 661 sized to receive a valve interface member or base 70 and a cartridge valve assembly 72. In other embodiments, the bonnet cup 66 may comprise other shapes. Illustratively, the bonnet cup 66 is comprised of brass, although other metals or polymers may also be used.

The bottom face 661 of the bonnet cup 66 illustratively includes a cutout 667 configured to receive a boss 701 extending from a lower surface 702 of the valve interface member or base 70 in a form fitting manner so that the lower surface 702 of the base 70 rests on a top surface 6611 of the bottom face 661 of the bonnet cup 66. Illustratively, the base 70 is in the form of a puck or a disk and includes a hot water inlet opening 703, a cold water inlet opening 704, and a tempered outlet 705, all extending between lower and upper surfaces 702 and 706, respectively. An outer perimeter 707 of the base 70 includes a groove 708 configured to receive a lower annular or radial seal 709. Illustratively, annular seal 709 comprises an O-ring made of rubber or another elastic polymer, which facilitates a fluid-tight connection between the base 70 and the internal surface (e.g., inner wall) 662 of the bonnet cup 66 to prevent leaks.

The base 70 further includes first locating elements, illustratively recesses 710a and 710b, formed within the upper surface 706 of the base 70. The recesses 710a and 710b are configured to receive second locating elements, illustratively pegs 721a and 721b, which are positioned on the bottom of the cartridge valve assembly 72 and extend downwardly from the lower surface 722 of the cartridge valve assembly 72. When assembled, engagement of pegs 721 with recesses 710 result in the cartridge valve assembly being at least partially disposed within the bonnet cup 66. In another embodiment, the first locating elements included on the base 70 may comprise pegs while the second locating elements located on the cartridge valve assembly 72 may comprise recesses. On an outer perimeter 726 of the cartridge valve assembly 72 near the lower surface 722, the cartridge valve assembly 72 includes a groove 727 configured to receive an upper annular or radial seal 728. Illustratively, annular seal 728 comprises an O-ring made of rubber or another elastic polymer, which facilitates a fluid-tight connection between the cartridge valve assembly 72 and an internal surface or inner wall 662 of the bonnet cup 66 to prevent leaks.

In an illustrative embodiment, an upper portion 6621 of the inner wall 662 of the bonnet cup 66 includes internal threads 6622. When assembled, a lip 729 of the cartridge valve assembly 72 rests just underneath the threads 6622 so that the remaining upper portion of the cartridge valve assembly 72 may extend above the upper edge 663 of the bonnet cup 66 while leaving the threads 6622 exposed. A mounting nut 74 is sized to fit snugly over the upper portion of the cartridge valve assembly 72 remaining exposed above the bonnet cup 66. The mounting nut 74 includes external threads 741 to mate with the internal threads 6622 of the bonnet cup 66, holding the cartridge valve assembly 72 in place within the bonnet cup 66 and compressing the cartridge valve assembly 72 and the base 70 together. The mounting nut 74 further includes a groove 742 located above the threading 741 around an outer perimeter of the mounting nut 74 configured to receive a retainer 743. Illustratively, the retainer 743 comprises an O-ring comprised of rubber or another elastic polymer, which facilitates the coupling of the mounting nut 74 with a decorative bonnet cap 76 for a smoother operation of the valve housing assembly 56. The bonnet cap 76 further covers the internal components of the valve housing assembly 56 and the valve assembly 3 for an aesthetically pleasing faucet 10.

Still referring to FIGS. 3-5, the illustrative cartridge valve assembly 72 includes a stem 730 received within the handle 58 so that the stem 730 moves with the movement of the handle 58 to operate the faucet 10 as further described below. The handle 58 further includes a handle nut 581 to be received within the handle 58 at an angle substantially orthogonal to the stem 730 as received within the handle 58 to hold the stem 730 in place relative to the handle 58. The handle nut 581 is held in place within the handle 58 via threading 582 and may be tightened within the handle 58 through use of a tool, such as, but not limited to, a screwdriver or a drill. A nut cap 583 may be received in the handle 58 over the handle nut 581 to provide an aesthetically pleasing handle 58 and facilitate the retention of the handle nut 581.

Figure 6:
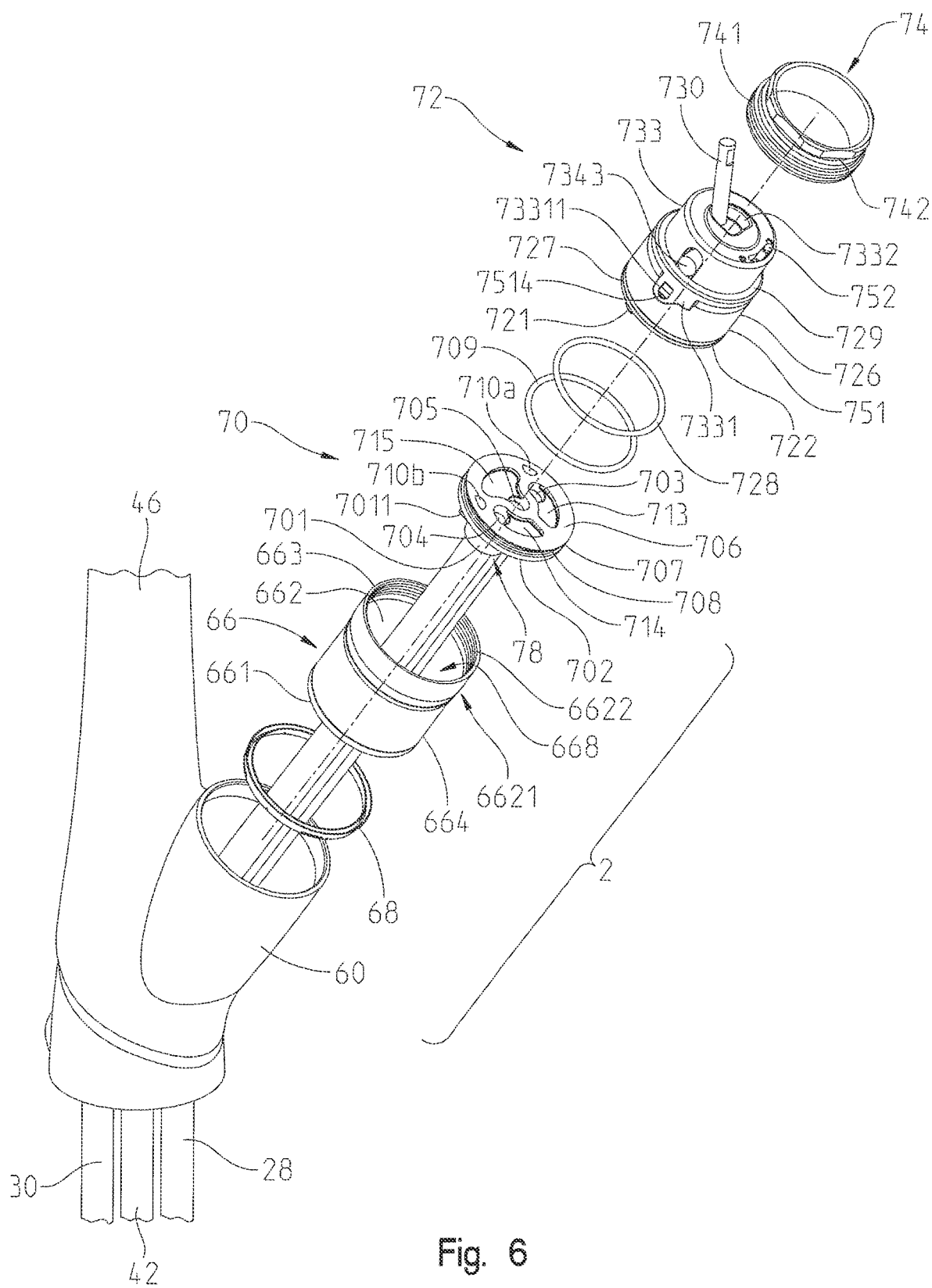
FIG. 6 is a partial exploded perspective view of the interior components of the valve housing assembly of FIG. 3A.

As shown in FIG. 4-6, a waterway assembly 2 is illustratively located within the hub 60 of the valve housing assembly 56 of the faucet 10. The waterway assembly 2 illustratively includes the hot water inlet tube 28, the cold water inlet tube 30, and the outlet tube 42. Further, the illustrative waterway assembly 2 includes the base 70, including the hot water inlet 703, the cold water inlet 704, and the tempered outlet 705 as mentioned above. The hot water inlet tube 28, the cold water inlet tube 30, and the outlet tube 42 are fluidly coupled to inlets 703, 704 and outlet 705, respectively, in the base 70. As detailed herein, the tubes 28, 30, and 42 are illustratively formed of a flexible non-metallic material, such as a polymer.

In the illustrative embodiment, the tubes 28, 30, 42, and the base 70 are formed of compatible materials, such as polymers, and illustratively of cross-linkable materials, thereby being illustratively electrically non-conductive. As used within this disclosure, a cross-linkable material illustratively includes thermoplastics and mixtures of thermoplastics and thermosets. In one illustrative embodiment, the tubes 28, 30, 42, and the base 70 are formed of a polyethylene which is subsequently cross-linked to form cross-linked polyethylene (PEX). However, it should be appreciated that other polymers may be substituted therefore. For example, any polyethylene (PE)(such as raised temperature resistant polyethylene (PE-RT), polypropylene (PP) such as polypropylene random (PPR)), or polybutylene (PB) may be used. It is further envisioned that cross-linked polyvinyl chloride (PVCX) with silane free radical initiators, cross-linked polyurethane, or cross-linked propylene (XLPP) using peroxide or silane free radical initiators may be used.

Figure 7:
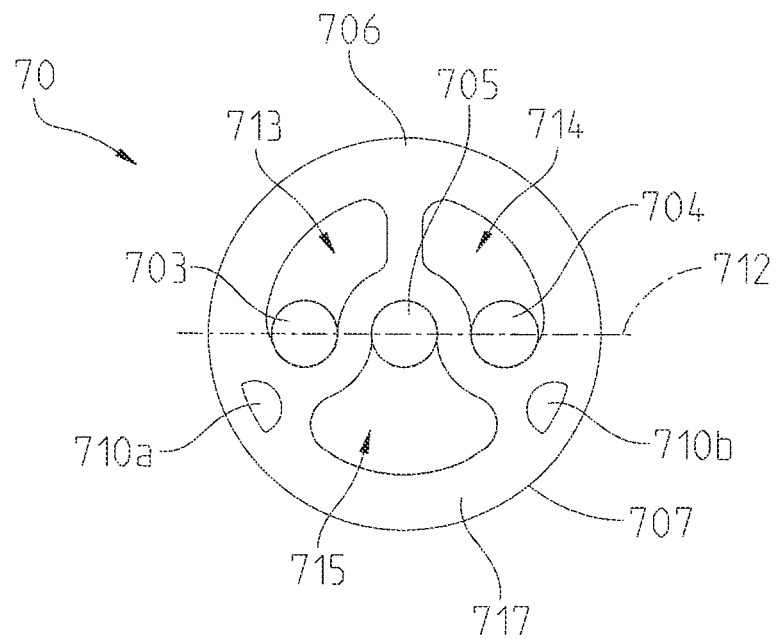
FIG. 7 is a top plan view of the base of the molded waterway assembly.
Figure 8:
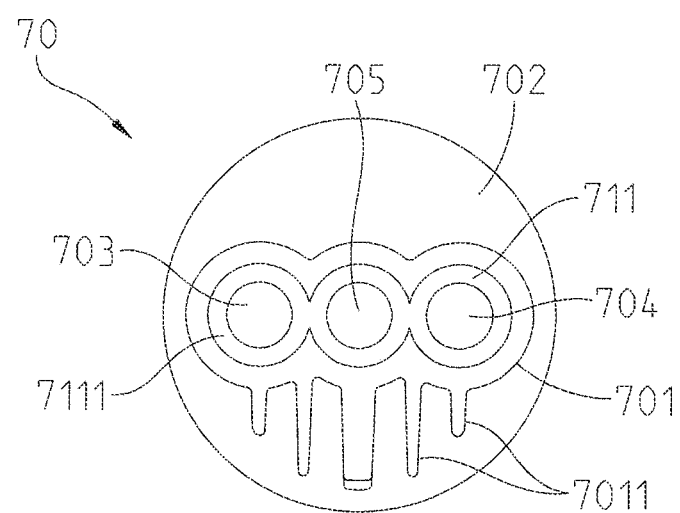
FIG. 8 is a bottom plan view of the base of the molded waterway assembly.

With reference to FIGS. 4-8, the upper ends 78 of the hot water inlet tube 28, the cold water inlet tube 30, and the outlet tube 42, are positioned in alignment with the inlets 703, 704 and the outlet 705, respectively, of the base 70. Each of the inlets 703, 704 and the outlet 705 includes a counterbore 711 (FIG. 8) extending downwardly from the lower surface 702 and defining a stop surface 7111 which cooperates with the upper ends 78 of the tubes 28, 30, and 42. In the illustrative embodiment, the base 70 is overmolded around the upper ends 78 of the tubes 28, 30, and 42. More particularly, the base 70 is formed of a polymer which is molded over the previously formed tubes 28, 30, and 42, in the manner detailed herein. The overmold base 70 partially melts the upper ends 78 of the tubes 28, 30, and 42, forming couplings or bonds between the material of the base 70 and the material of the tubes 28, 30, and 42. To facilitate the molding process, the inlets 703, 704 and the outlet 705, and thus tubes 28, 30, and 42, respectively, are illustratively aligned along a common center axis 712 (FIG. 7). Further, as shown in FIG. 8, a support or boss 701 illustratively extends downwardly from lower surface 702 of the base 70 and surrounds the inlets 703, 704 and the outlet 705. The boss 701 provides additional support to the tubes 28, 30, and 42 coupled to the base 70. In the illustrative embodiment, the boss 701 includes ridges 7011, which assists in facilitating the proper orientation of the waterway assembly 2 relative to the bonnet cup 66. While an illustrative orientation is described in the drawings, other ways to orient the waterway assembly 2 relative to the bonnet cup 66 are recognized.

In the illustrative embodiment detailed herein, the base 70 is formed of polyethylene which has been overmolded around the tubes 28, 30, and 42, and subsequently cross-linked. It should be noted that reinforcing members, such as glass fibers, may be provided within the polyethylene of the base 70. While a polymer, such as cross-linkable polyethylene, is the illustrative material for the base 70, in certain embodiments other materials may be substituted therefore, such as brass or copper. Additionally, the tubes 28, 30, and 42 may be fluidly coupled to the base 70 in a variety of manners other than through overmolding, such as ultrasonic welding or heat staking.

Figure 9:
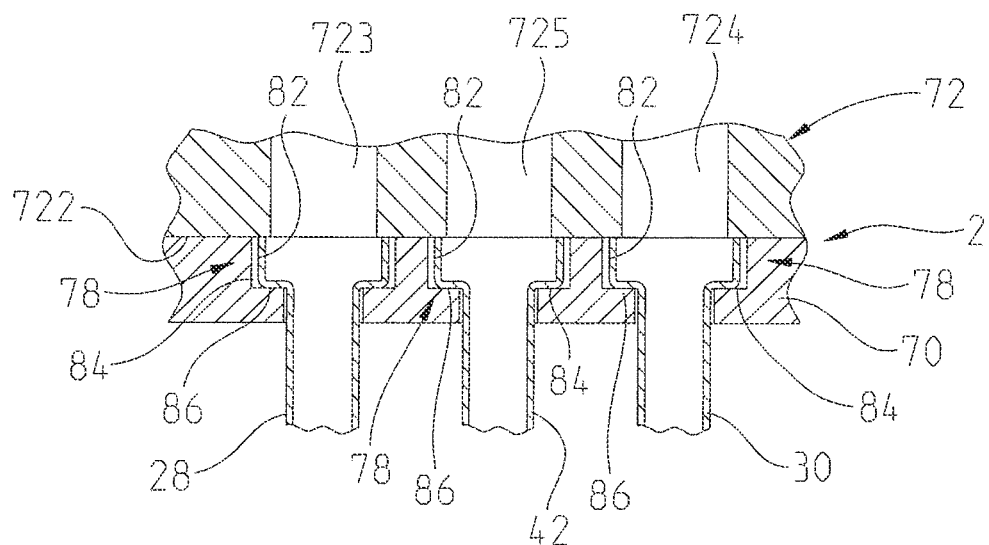
FIG. 9 is a diagrammatic cross-sectional view showing another illustrative fluid coupling arrangement for the waterway assembly.
Figure 10:
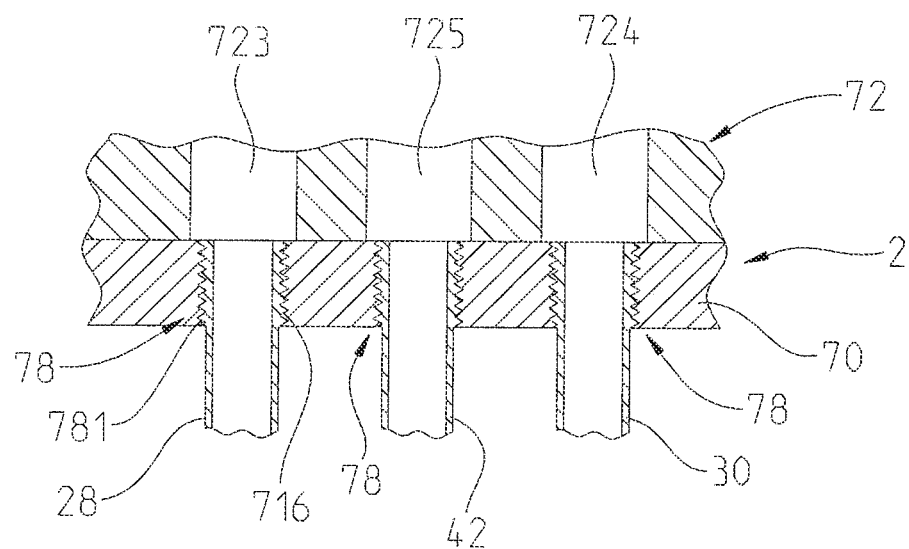
FIG. 10 is a diagrammatic cross-sectional view similar to FIG. 9, showing a further illustrative fluid coupling for the waterway assembly.

With reference now to FIGS. 9 and 10, illustrative alternative means for coupling the tubes 28, 30, and 42 are shown. For example, in FIG. 9, the upper ends 78 of the tubes 28, 30, and 42 include enlarged portions 82 configured to be received within cooperating counterbores 84 formed within base 70. As may be appreciated, each enlarged portion 82 is retained intermediate a lip 86 formed within counterbores 84 of the base 70 and the lower surface 722 of the cartridge valve assembly 72 (FIGS. 3-6). Each enlarged portion 82 may illustratively be formed integral with each tube 28, 30, and 42, respectively, or as a separate component, such as an overmold. As shown in the further illustrative embodiment of FIG. 10, the upper ends 78 may include external threads 781 which threadably engage internal threads 716 formed within the base 70.

As detailed herein, the base 70 of the waterway assembly 2 is illustratively secured to the tubes through overmolding. The basic principle of overmolding plumbing connections on the tubes is well known. In the present method, the tubes 28, 30 and 42 are illustratively positioned within a mold (not shown) wherein pins or mandrels slide into each respective tube 28, 30, and 42 to prevent collapsing thereof during the injection molding process. The mold receives the parallel aligned ends of the tubes 28, 30, and 42 and then receives a flowable polymer, illustratively polyethylene, which forms the appropriate base 70. As further detailed herein, the upper ends 78 of the tubes 28, 30, and 42 are aligned along a common axis 715 to facilitate opening and closing of portions of the mold. After the polymer sufficiently hardens, the mold is opened to release the base 70 and the tubes 28, 30, and 42. Through overmolding, each end 78 of each tube 28, 30, and 42 partially melts and bonds with the overmolded material of the base 70, creating a substantially monolithic assembly, such as waterway assembly 2.

As is known, polyethylene is flexible, or semi-rigid, and may be cross-linked to form PEX. Cross-linking polyethylene couples the individual molecule chains together and prevents splitting. The curing or cross-linking process may use any one of several different technologies to form, for example PEX-A, PEX-B, or PEX-C. PEX-A is formed by using peroxide to cross-link polyethylene. More particularly, PEX-A is formed of a polyethylene having incorporated therein peroxide. Upon heating the peroxide polyethylene above the decomposition temperature of the peroxide, "free" radicals are produced to initiate the cross-linking process. PEX-B is formed by using silane to cross-link polyethylene. PEX-B is formed by using silane-grafted polyethylene which is then "moisture-cured" by exposure to heat and water, also known as sauna curing. PEX-C is formed of polyethylene which is cross-linked by bombarding it with electromagnetic (gamma) or high energy electron (beta) radiation.

By overmolding, it is possible to obtain a material to material bond, thereby providing a substantially leak-proof coupling between the tubes 28, 30, and 42 and the base 70. The resulting overmolded assembly is then cross-linked by means known in the art, e.g., peroxide cross-linking, silane cross-linking, radiation cross-linking, etc. More particularly, and as detailed above, cross-linking can be performed by a silane process or a peroxide process, or combinations thereof, wherein cross-linking is completed in a hot bath. Each process has a cross-linking catalyst that causes the polymer to crosslink when certain temperature and pressure and/or humidity are used. In the illustrative embodiment, the assembly is passed under a radiation unit and the exposure causes cross-linking. While illustratively the final product is cross-linked, in certain circumstances it might be appropriate to cross-link individual components 28, 30, 42, and 70. In a further illustrative embodiment, the material for the base 70 may be partially cross-linked prior to overmolding, followed by further cross-linking after coupling to the tubes 28, 30, and 42.

Figure 11:
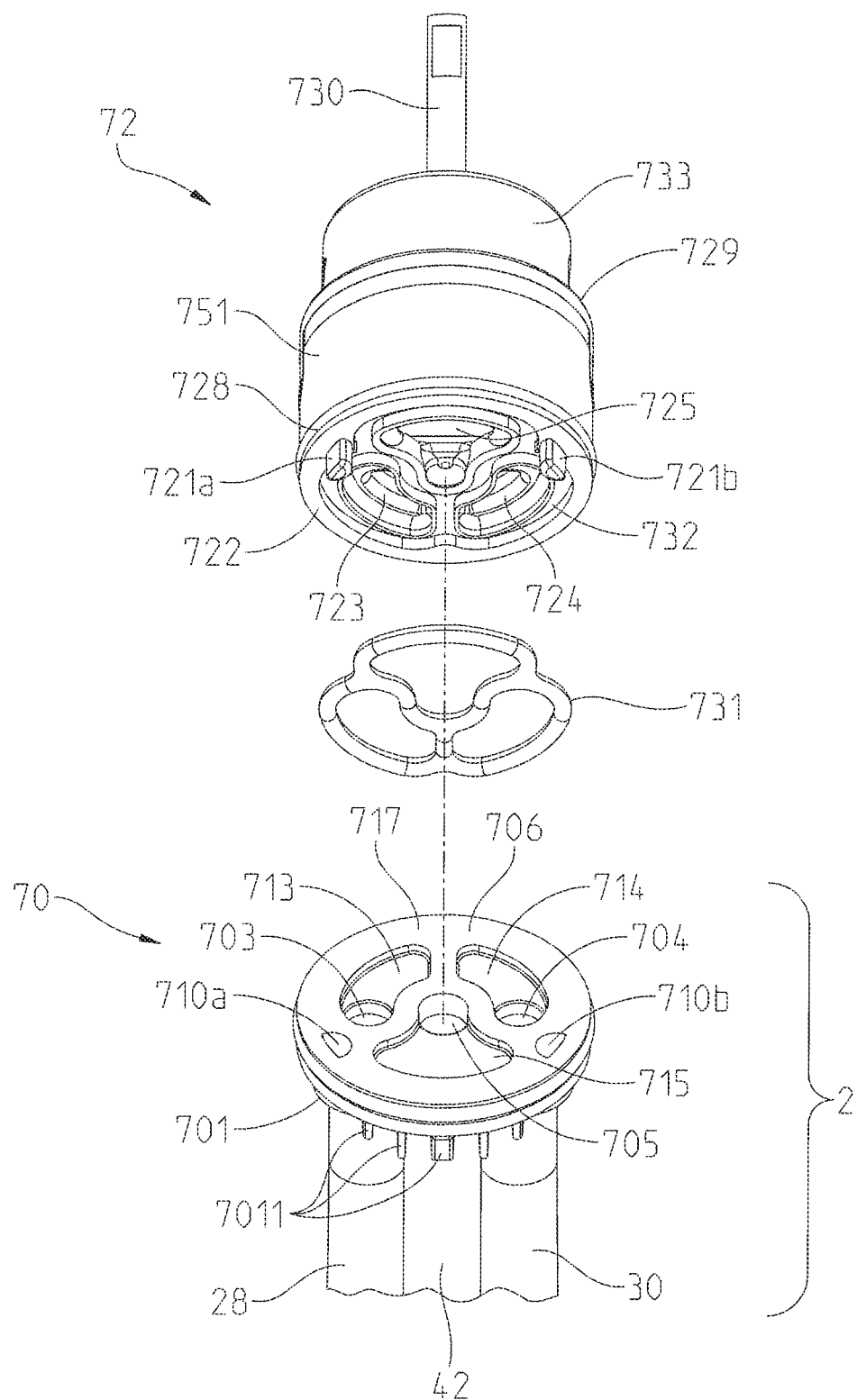
FIG. 11 is a partial exploded perspective view of the faucet of FIG. 1, showing the interface between the molded waterway assembly and the cartridge valve assembly.

With reference to FIG. 11, and as mentioned above, the cartridge valve assembly 72 is supported by the base 70 of the waterway assembly 2. As discussed above, pegs 721a and 721b are illustratively positioned on the lower surface 722 of the cartridge valve assembly 72 and extend downwardly from the lower surface 722 of the cartridge valve assembly 72; corresponding recesses 710a and 710b are formed within the upper surface 706 of the base 70. The position of the pegs 721 within the recesses 710 facilitates proper orientation of the cartridge valve assembly 72 relative to the molded waterway assembly 2 and hence, alignment of the tubes 28, 30, and 42 and respective inlets 703, 704 and outlet 705 with hot water port 723, cold water port 724, and tempered water port 725, respectively, of the cartridge valve assembly 72. Additionally, a hot flow directing channel 713, a cold water flow directing channel 714, and a tempered water flow directing channel 715 are formed within the upper surface 706 of the base 70 to facilitate fluid flow between inlets 703, 704, outlet 705, and corresponding ports 723, 724, and 725, respectively.

As a result of the above structure, the hot water inlet tube 28 places the hot water supply 16 (FIG. 1) in fluid communication with the cartridge valve assembly 72 via hot water inlet 703 of the base 70 and hot water port 723 of the cartridge valve assembly 72. Likewise, the cold water inlet tube 30 places the cold water supply 18 (FIG. 1) in fluid communication with the cartridge valve assembly 72 via cold water inlet 704 and cold water port 724 of the cartridge valve assembly 72. The outlet tube 42 places the cartridge valve assembly 72 in fluid communication with the outlet 44 of the faucet 10 via tempered water port 725. Engagement between the pegs 721 and the recesses 710 may also improve resistance to torque generated between the cartridge valve assembly 72 and the base 70 during operation of the faucet 10.

Still referring to the illustrative embodiment of FIG. 11, the lower surface 722 of the cartridge valve assembly 72 sealingly engages a face or axial seal, illustratively a silicone gasket 731 received intermediate the base 70 and the cartridge valve assembly 72. With reference to FIG. 4, the gasket (face seal) 731 is positioned intermediate the lower annual seal 709 and the upper annular seal 728. The gasket 731 is received within a channel 732 formed within lower surface 722 of the cartridge valve assembly 72 and seals against a seat 717 formed by the upper surface 706 of the base 70. The gasket 731 extends around the hot water flow directing channel 713, the cold water flow directing channel 714, and the tempered water flow directing channel 715 to assist in preventing the unwanted mixing of water within each of the channels 713, 714, and 715.

Figure 12:
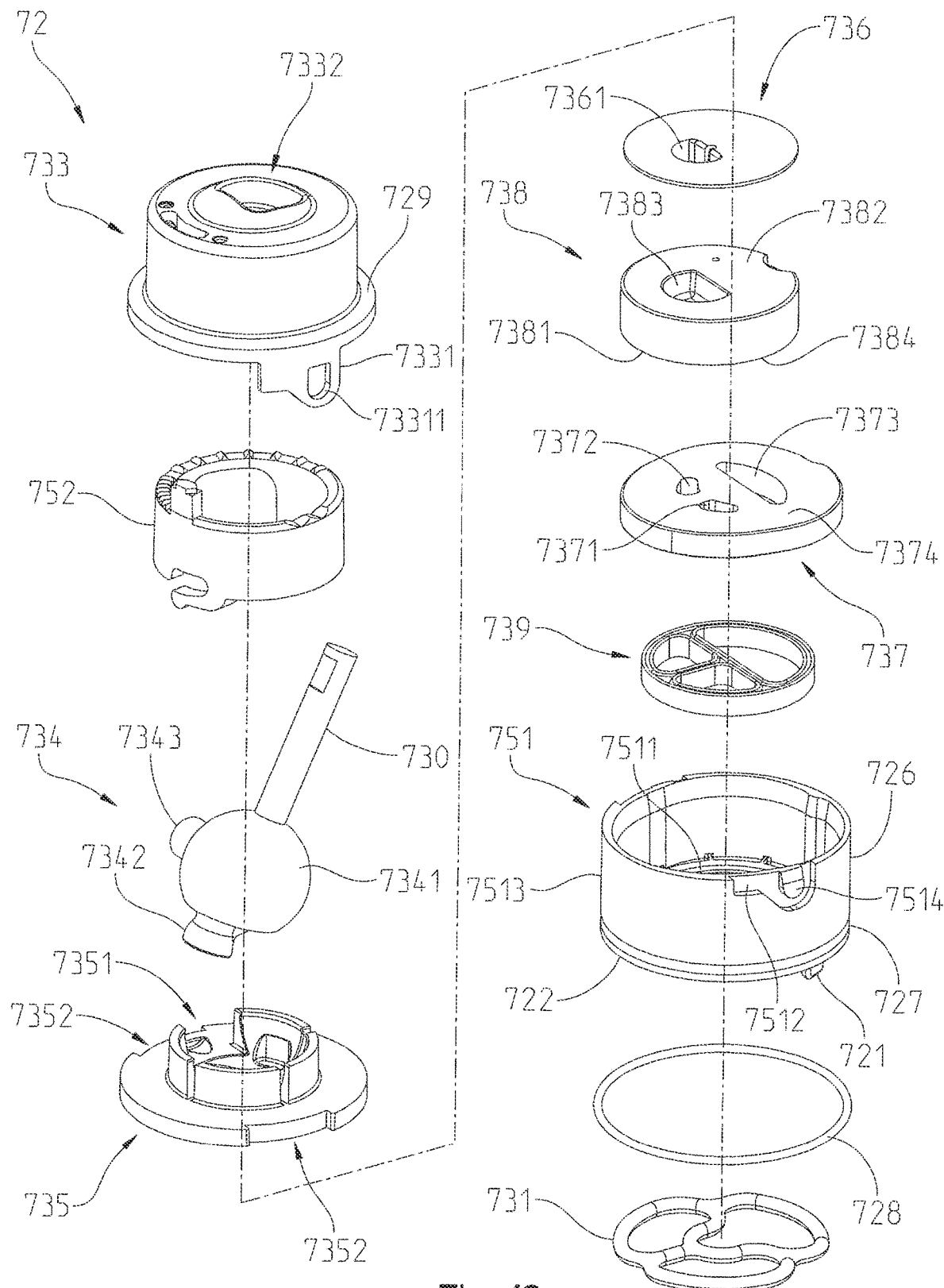
FIG. 12 is an exploded perspective view of the cartridge valve assembly.

As shown in FIG. 12, the illustrative cartridge valve assembly 72 illustratively includes an upper housing 733, a stem assembly 734, a coupling member 735, a carrier 736, a moveable disc or member 738, a stationary disc or member 737, a seal 739, and a lower housing 751. The stem assembly 734 illustratively includes a ball 7341 molded from a thermoplastic material over a portion of the stem 730. A longitudinal extension or knuckle 7342 extends downwardly from ball 7341. The ball 7341 is configured to transmit motion of the stem 730 to the moveable member 738 through the extension 7342 and the carrier 736.

Now referring to FIGS. 4, 5 and 12, the stationary member 737 is illustratively disposed within the lower housing 751 of the cartridge valve assembly 72 and sits above ports 723, 724, and 725, with the seal 739 sandwiched between the stationary member 737 and an interior face 7511 of the lower housing 751. The seal 739 is illustratively comprised of rubber or another elastic polymer to facilitate a fluid-tight connection between the stationary member 737 and the lower housing 751. The lower stationary member 737 includes a hot water aperture 7371, a cold water aperture 7372, and a tempered or mixed water aperture 7373 that correspond with (i.e., in fluid communication with) the hot water port 723, the cold water port 724, and the outlet port 725, respectively. The moveable member 738 is also disposed within the cartridge valve assembly 72 and sits on top of the stationary valve member 737. The moveable member 738 includes a bottom face 7381 and a top face 7382. The bottom face 7381 touches and is configured to slide (translate) across a top surface 7374 of the stationary member 737. Additionally, the bottom face 7381 of the moveable member 738 includes a recess 7384 that is capable of being in selective communication with any or all of the hot water aperture 7371, the cold water aperture 7372, and the tempered water aperture 7373 of the stationary member 737. The top face 7382 of the translating member has an opening 7383 sized to fit the extension 7342 of the stem assembly 734.

The carrier 736 rests above moveable member 738 and includes an aperture 7361 which is sized and shaped to receive the extension 7342 of the stem assembly 734 in a friction fit manner that facilitates the movement of the moveable member 738 upon movement of the stem assembly 734 while also holding the stem assembly 734 in place within the coupling member 735. The coupling member 735 holds the ball 7341 in such a manner that the ball 7341 can rotate with corresponding movement of the handle 58, thereby moving the extension 7342 and the translating member 738 to operate the faucet 10 (FIG. 1). The coupling member 735 includes an opening 7351 sized to fit a protrusion 7343 coupled to the ball 7341 of the stem assembly 734. In an illustrative embodiment, the ball 7341 and the protrusion 7343 are made of a polymer and are manufactured as one piece. In alternate embodiments the protrusion 7343 and the ball 7341 may be manufactured as two separate pieces and later coupled to form one piece. In another embodiment, the ball 7341 and the protrusion 7343 may be comprised of material other than a polymer, such as brass or another metal.

Still referring to FIGS. 4, 5, and 12, the illustrative upper housing 733 includes tabs 7331 that fit within grooves 7352 on the perimeter of the coupling member 735 so that the upper housing 733 can fit over the coupling member 735 and the stem assembly 734 to allow the stem 730 to exit through an aperture 7332 at the top of the upper housing 733, allowing the stem 730 to interact with the handle 58. The tabs 7331 include apertures 73311, formed so that the tabs 7331 and apertures 73311 are capable of fitting within grooves 7512 formed by an outer sidewall 7513 and tabs 7514 of the lower housing 751. When assembled, tabs 7514 are inserted into apertures 73311 to facilitate the coupling of the upper housing 733 to the lower housing 751.

An illustrative cartridge valve assembly 72 may also include a temperature limiting member 752 received intermediate the coupling member 735 and the upper housing 733. The temperature limiting member 752 is configured to limit lateral pivoting movement of the stem 730 and the extension 7342, hence also limiting the maximum allowable temperature of water flowing through the cartridge valve assembly 72.

As discussed above, the handle 58 is illustratively configured to move in a direction substantially away from the faucet body 46. In the resting position as shown in FIG. 4, the recess 7384 is in fluid communication with the tempered water aperture 7373 of the stationary member 737 and the tempered water port 725 of the cartridge valve assembly 72. In this position, the hot water aperture 7371 and the cold water aperture 7372 of the stationary member 737 are blocked by the bottom face 7381 so that they are not in fluid communication with the recess 7384. As a result, no fluid pathway exists between the hot water supply 16 (FIG. 1) and/or the cold water supply 18 (FIG. 1) and the tempered water port 725. In other embodiments, the recess 7384 may not be in fluid communication with any of the water apertures 7371, 7372, or 7373 of the stationary member 737.

As the handle 58 moves, the stem 730 moves with the handle 58, causing the assembly formed by the stem 730 and the handle 58 to pivot about the orthogonal axis 64 (FIG. 3), causing the extension 7342 to move. As the extension 7342 moves with the handle 58, the moveable member 738 translates across the top surface 7374 of the stationary member 737 to bring the recess 7384 of the moveable member 738 in fluid communication with the hot water tube 28 and/or the cold water tube 30 while remaining in fluid communication with the outlet tube 42. In this position, the hot water tube 28 and/or the cold water tube 30 are in fluid communication with the outlet tube 42 via the recess 7384 of the moveable member 738.

For example, referring to FIGS. 1-5 and 11-12, when in operation, hot water may be supplied from the hot water supply 16 to the hot water tube 28, through the hot water inlet 703 of the base 70 into the hot flow channel 713, through the hot water port 723 of the cartridge valve assembly 72, and through the hot water aperture 7371 into the recess 7384 of the moveable member 738, then is released into the outlet tube 42 from the recess 7384 of the moveable member 738 via the tempered water aperture 7373 of the stationary member 737, the tempered water port 725 of the cartridge valve assembly 72, and the tempered water flow channel 715 and tempered outlet 705 of the base 70. Similarly, when in operation, cold water may be supplied from the cold water supply 18 to the cold water tube 30, through the cold water inlet 704 of the base 70 into the cold water flow channel 714, through the cold water port 724 of the cartridge valve assembly 72, and through the cold water aperture 7372 into the recess 7384 of the moveable member 738, then is released into the outlet tube 42 from the recess 7384 of the moveable member 738 via the tempered water aperture 7373 of the stationary member 737, the tempered water port 725 of the cartridge valve assembly 72, and the tempered water flow channel 715 and tempered outlet 705 of the base 70.

As the stem 730 rotates with the handle 58, the moveable member 738 rotates. When the faucet 10 is operational and the recess 7384 of the moveable member 738 is in fluid communication with the water supplies 16 and 18, rotation of the handle 58 about the longitudinal axis 62 determines the temperature of the water being disposed into the outlet tube 42. For example, if the rotation of the handle 58 puts the recess 7384 in more communication with the hot water supply 16 than the cold water supply 18, then the water being disposed into the outlet tube 42 will be hotter than if the recess 7384 was in more or equal communication with the cold water supply 18 than the hot water supply 16.

As may be appreciated, the illustrative faucet 10 detailed above is configured to prevent leaks, both below and above the mounting or sink deck. More particularly, the gasket or face seal 731 provides for a primary seal against water leakage from between the cartridge valve assembly 72 and the base 70 of the waterway assembly 2. Should a leak occur at the interface between the cartridge valve assembly 72 and the base 70, then the lower annular seal 709 and the upper annular seal 728 prevent leakage from outside of the bonnet cup 66. Instead, pressurized water from the inlet tubes 28 and 30 is directed to atmosphere through the outlet tube 42 extending within the delivery spout 46.

Although the invention has been described in detail with reference to certain preferred embodiments, variations and modifications exist within the spirit and scope of the invention as described and defined in the following claims. Likewise, although the invention has been described in detail with reference to water flow, other fluids may be used consistent with the described invention.

What is claimed is:

1. A faucet assembly comprising:
a housing body including a sidewall defining an opening;
a valve assembly received within the opening of the housing body;
a waterway assembly including a base supporting the valve assembly;
a face seal between the valve assembly and the base of the waterway assembly, the face seal sealingly engaging a lower surface of the valve assembly and an upper surface of the base of the waterway assembly;
an upper radial seal between the valve assembly and an internal surface of the housing body, the upper radial seal positioned above the face seal; and
a lower radial seal between the base and the internal surface of the housing body, the lower radial seal positioned below the face seal.

2. The faucet assembly of claim 1, wherein the waterway assembly further includes a plurality of tubular members having first and second ends, the first ends received by openings of the base.

3. The faucet assembly of claim 1, further comprising a handle coupled to the valve assembly.

4. The faucet assembly of claim 1, wherein the housing body further includes a bottom face opposite the opening formed by the sidewall smaller than the area formed by a perimeter of the sidewall.

5. The faucet assembly of claim 1, wherein the faucet valve assembly includes a lower housing with a groove configured to receive the upper radial seal.

6. The faucet assembly of claim 1, wherein the base includes a groove around a perimeter of the base configured to receive the lower radial seal.

7. The faucet assembly of claim 1, further comprising a mounting nut configured to removably couple to the housing body within the opening defined by the sidewall.

8. The faucet assembly of claim 7, further comprising a bonnet cap supported by the mounting nut, and an o-ring removably coupling the bonnet cap to the mounting nut.

9. The faucet assembly of claim 1, wherein the base of the waterway assembly includes a plurality of openings extending between the upper surface and a lower surface.

10. The faucet assembly of claim 9, wherein the lower surface of the base includes a boss formed at least around the openings and extending away from the upper surface.

11. A faucet assembly comprising:
a housing body including a sidewall defining an opening;
a valve assembly received within the opening of the housing body;
an upper radial seal supported by the valve assembly and configured to engage with an internal surface of the housing body;
a base supporting the valve assembly at a valve interface;
a face seal at the valve interface between the valve assembly and the base;
a lower radial seal received within a groove around a perimeter of the base, and configured to engage with the internal surface of the housing body;
a plurality of tubular members having first and second ends, the plurality of tubular members supported by the base and configured to be in fluid communication with the valve assembly;
a mounting nut configured to removably couple to the housing body within the opening defined by the sidewall;
wherein the upper radial seal of the valve assembly contacts the internal surface of the sidewall of the housing body to form a substantially fluid-tight seal; and
wherein the base includes a first face, a second face, and a plurality of openings extending between the first face and the second face, the openings sized to receive the first end of each of the tubular members.

12. The faucet assembly of claim 11, further comprising a handle coupled to the valve assembly.

13. The faucet assembly of claim 11, wherein the valve assembly includes a lower housing with a groove configured to receive the upper radial seal.

14. The faucet assembly of claim 11, wherein the housing body further includes an endwall opposite the opening formed by the sidewall smaller than the area formed by a perimeter of the sidewall.

15. The faucet assembly of claim 14, wherein the second face of the base includes a boss formed at least around the openings and extending away from a surface of the first face, the boss configured to form fit into an opening formed by the endwall of the housing body to couple to the housing body.

16. The faucet assembly of claim 15, wherein the at least a portion of the surface of the second face of the base contacts an interior surface of the endwall of the housing body when the base and the housing body are coupled.

17. A faucet assembly comprising:
a housing body including a sidewall defining an opening;
a valve assembly received within the opening of the housing body;
a waterway assembly including a base supporting the valve assembly at a valve interface;
a face seal at the valve interface between the valve assembly and the base of the waterway assembly;
an upper radial seal supported by the valve assembly, and positioned between the valve assembly and an internal surface of the housing body, the upper radial seal positioned above the face seal; and
a lower radial seal received within a groove around a perimeter of the base, and positioned between the base and the internal surface of the housing body, the lower radial seal positioned below the face seal.

18. The faucet assembly of claim 17, wherein the waterway assembly further includes a plurality of tubular members having first and second ends, the first ends received by openings of the base.

19. The faucet assembly of claim 17, further comprising a mounting nut configured to removably couple to the housing body within the opening defined by the sidewall.

20. The faucet assembly of claim 17, wherein the base of the waterway assembly includes a first face, a second face, and a plurality of openings extending between the first face and the second face.

\* \* \* \* \*